(No Model.)

J. J. WHITE.
HOISTING MACHINE.

No. 291,251. Patented Jan. 1, 1884.

WITNESSES:
A. P. Grant
H. F. Kircher

INVENTOR:
Joseph J. White,
BY John A. Niedersheim
ATTORNEY.

UNITED STATES PATENT OFFICE.

JOSEPH J. WHITE, OF NEW LISBON, NEW JERSEY.

HOISTING-MACHINE.

SPECIFICATION forming part of Letters Patent No. 291,251, dated January 1, 1884.

Application filed July 23, 1883. (No model.)

*To all whom it may concern:*

Be it known that I, JOSEPH J. WHITE, a citizen of the United States, residing at New Lisbon, in the county of Burlington, State of New Jersey, have invented a new and useful Improvement in Hoisting-Machines, which improvement is fully set forth in the following specification and accompanying drawings, in which—

Figure 1:
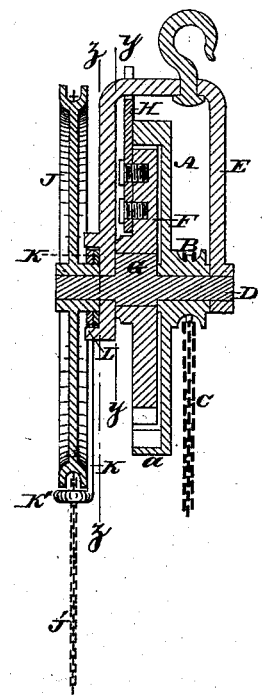
Figure 2:
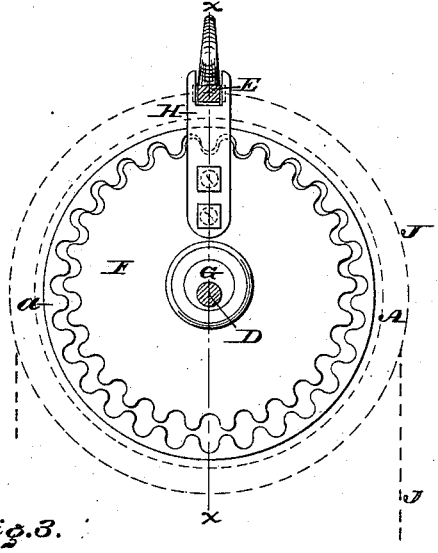
Figure 3:
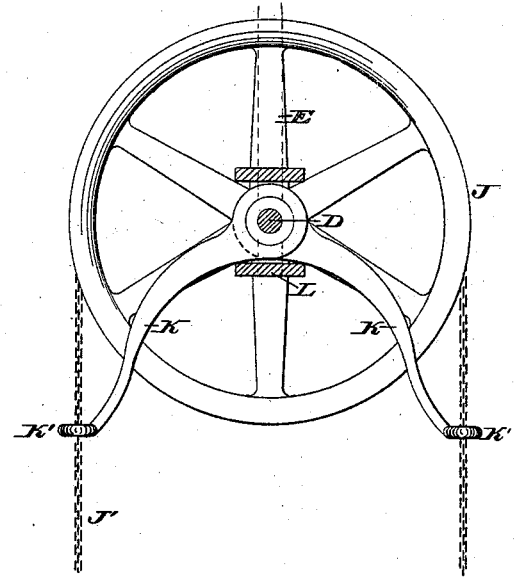

Figure 1 is a vertical section in line $xx$, Fig. 2, of a hoisting-machine embodying my invention. Fig. 2 is a vertical section thereof in line $yy$, Fig. 1. Fig. 3 is a vertical section thereof in line $zz$, Fig. 1.

Similar letters of reference indicate corresponding parts in the several figures.

My invention consists of a hoisting-machine formed of a winding-wheel having a toothed rim, a disk having a toothed periphery, an eccentric which causes said disk to sway in a rotary direction and engage with the winding-wheel, a hand-wheel, a yoke whose limbs support opposite ends of the shaft, on which said winding-wheel, disk, and hand-wheel are fitted, and an arm which permits the swaying of the disk and prevents rotation of the same, whereby an inexpensive, easily-operated, powerful, strong, and comparatively noiseless machine is produced, as will be hereinafter set forth.

It also consists in providing the hand or driving wheel with guides located on opposite sides thereof, independent of each other, whereby strain on one guide will not be imparted to the other, as will be hereinafter fully set forth.

Referring to the drawings, A represents a wheel, to which is secured or with which is formed a drum or pulley, B, on which the hoisting-chain C is wound, said wheel and pulley being mounted loosely on a shaft, D, whose bearings are on the yoke E, the latter being bent, bifurcated, or arch-shaped, presenting a strong structure, with two limbs for supporting said shaft at opposite places in a uniform and powerful manner, the strain or weight of the machine being received by said yoke. The wheel A is formed with a rim, $a$, which is internally toothed, and receives within it a toothed disk, F, which engages with said rim, and has one tooth less than the same, said disk having a central opening, within which is fitted an eccentric, G, the latter being formed with or secured to the shaft D.

H represents an arm, which is firmly secured to the disk F, and has its outer end loosely connected with the yoke E, the connection being either by bifurcating the arm, so that it straddles the yoke, or forming an opening in the yoke to receive the arm.

J represents what is known as the "hand-wheel," which may be of the form of a sprocket-wheel, or have a grooved pulley for the chain or rope J', whereby, when said wheel is rotated, power is communicated to the shaft D, and consequently to the eccentric G. This causes the disk F to sway in a rotary direction, actual rotation thereof being prevented by the arm H, so that to each rotation of the eccentric there is an engagement of the teeth of the disk F with the teeth of the rim $a$ of the wheel A, causing the latter to rotate a distance equal to one tooth and the hoisting-chain to be wound on the pulley or drum B a corresponding distance, the operation of the winding-wheel thus being easily accomplished, powerful, and comparatively noiseless.

On the shaft D, or hub of the wheel J, are fitted two arms, K, which project in opposite directions, and have at their ends the eyes K', through which the hand rope or chain J' is passed, and thereby guided.

Projecting from the side of the yoke is a horizontal lug, L, which occupies a position below the shaft D, adjacent to the pivotal portion of the arms K, whereby both arms may abut against said lug at or about said pivotal portion.

It will be seen that when the chain or rope J' is operated the eyes K' prevent displacement of the chain or rope from the wheel J and guard the hand from being caught on the latter. Should either arm be drawn downward by any irregular motion of the chain or rope J, the strain is received by the lug or abutment L without communicating the same to the other arm, so that the latter retains its position and is prevented from being fractured, the two arms having a common axis and independent motions, as is evident.

I am aware that the wheel A, with toothed rim $a$, and the toothed disk F, with the differential number of teeth, are not new, and do not claim the same, broadly; but, Having fully described my invention and the advantages thereof, what I do claim as new, and desire to secure by Letters Patent, is—

1. A yoke, E, a shaft, D, mounted thereon, having an eccentric, G, a winding-wheel, A, with internal gear, a hoisting-chain, C, a swaying disk, F, with toothed periphery, a hand-wheel, J, and hand chain or rope J', and an arm, H, secured to said disk and engaging with said yoke, the winding wheel, disk, and hand-wheel being fitted on said shaft D, and the limbs of the yoke supporting the shaft at opposite ends, said parts being constructed and combined as described, and forming an improvement in hoisting-machines.

2. A yoke-shaft with eccentric, winding-wheel with internal gear, a swaying disk with toothed periphery, a hand-wheel, an arm, and guides for the chain or rope of the hand-wheel, combined and operating substantially as and for the purpose set forth.

3. In a hoisting-machine, a driving-wheel, in combination with a yoke having a lug or abutment, and two guiding-arms for the chain or rope, independent of each other, substantially as and for the purpose set forth.

JOSEPH J. WHITE.

Witnesses:
JOHN A. WIEDERSHEIM,
A. P. GRANT.